Patented Apr. 19, 1949

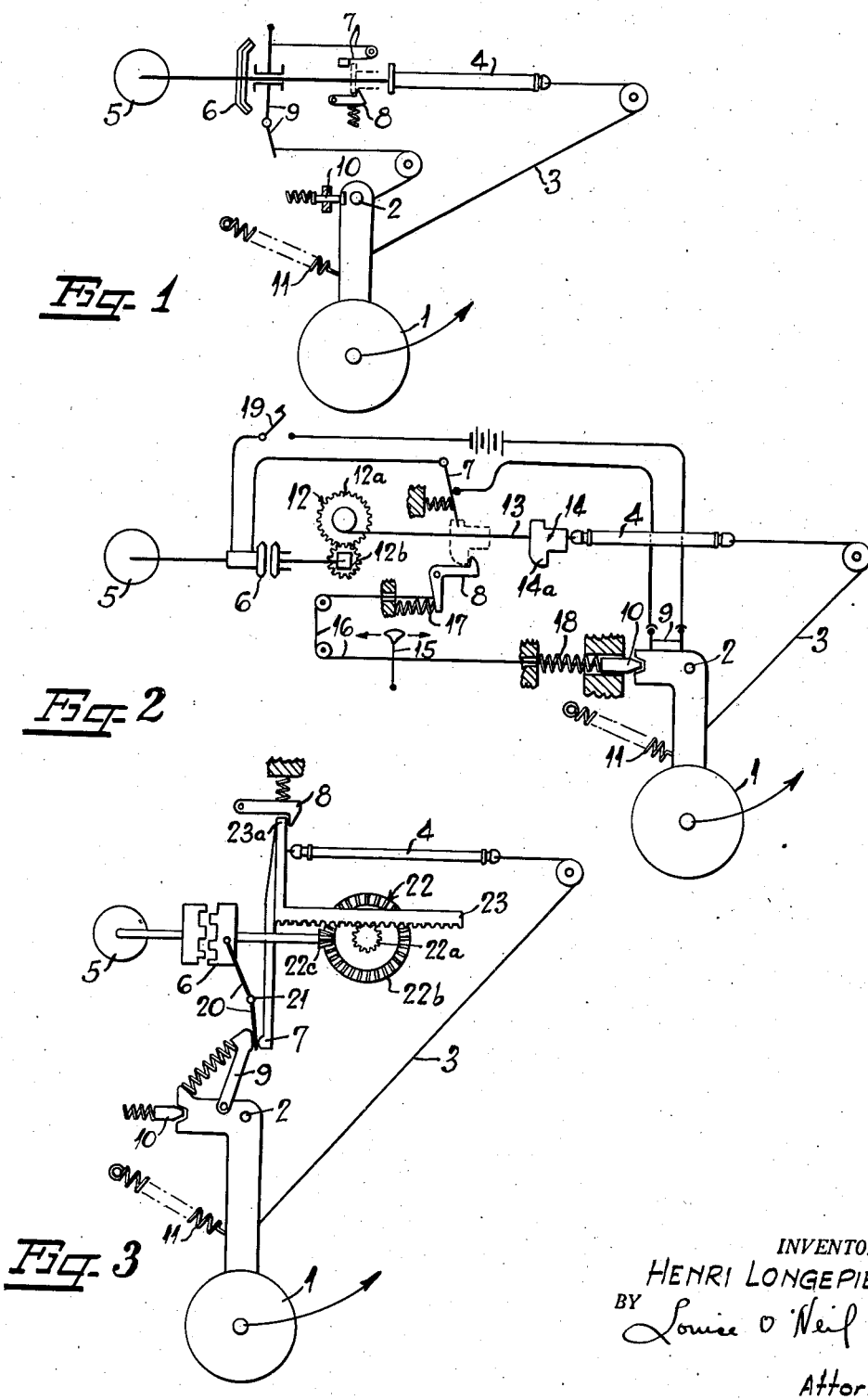

2,467,898

UNITED STATES PATENT OFFICE 2,467,898

RETRACTABLE LANDING GEAR

Henri Longepierre, Lyons, France; vested in the Attorney General of the United States Application July 27, 1943, Serial No. 496,273
In France December 24, 1941

6 Claims. (Cl. 244—102)

The present invention concerns a raising device for landing gear of aircraft, characterized by the fact that the necessary energy to put successively the landing undercarriage up and down is stored in an energy-accumulator as soon as the landing gear reaches the "down" position.

Preferably, the accumulator is formed of two elements, one of which supplies the energy for the raising, the second one, the energy for the following depressing of the landing gear, the second element being charged with the energy of the first element during the raising.

The annexed drawing shows several examples of means for realizing the invention. In the various figures of the drawing, the corresponding elements bear the same reference numerals.

In Figure 1, which is a lineal diagram of an example of the invention, the landing gear 1, movable around the axis 2, is connected by drive 3, to the first element 4 of a suitable energy-accumulator of any type whatever (spring, elastic element, screw jack). A motor 5 stores energy in element 4 by means of a drive furnished with a clutch 6, and means connecting the clutch to said energy-accumulator; said means being mechanical, for instance, a drum on which a cable connected to the accumulator is rolled, up or gear elements having a toothed rack connected to the accumulator and united to the driven portion of the clutch. A control member 7 disconnects motor 5 as soon as the energy stored in 4 reaches a sufficient amount. A lock device 8 is provided so that the drive 3 and the energy-accumulator 4 are kept in the state in which they were when the energy-accumulator 4 was put under tension. A control member 9, the working of which determines the position of the landing gear undercarriage, engages the clutch when the landing gear reaches the "down" position. A locking device 10 keeps the landing gear in this position. A second accumulator 11 (spring, elastic element, screw jack) is provided for the storing, during the raising operation, an amount of energy used for depressing the landing gear.

The working of the device according to the invention is as follows:

As soon as the landing gear reaches the "down" position, the control member 9 engages the clutch 6 and the motor 5 operates so as to store energy in the accumulator 4 up to a certain level, at which level the control member 7 disengages the motor 5. When the aircraft has taken off and leaves the ground and it is desired to raise the landing gear, it is necessary only to release the locking device 10. The energy stored in the accumulator 4 is thereby freed and by means of drive 3 causes the raising of the landing gear, the energy stored in accumulator 4 being sufficient to overbalance both the weight of the landing gear and the resistance of the accumulator 11. The lock device 8 keeps the drive 3 and the energy-accumulator 4 in the state in which they are when the landing gear reaches its "raised" position. When it is desired to put the landing gear down, the locking device 8 is released and the energy remaining in the accumulator 4 is thereby freed, and because this energy is no longer sufficient to overbalance the weight of the undercarriage of the landing gear and the accumulator 11, the landing gear is put down. As soon as the carriage reaches the "down" position the locking device 10 works again and holds the undercarriage in said position while the control member 9 lets in the motor clutch 6, and the cycle of the operations described above begins again.

Figures 2 and 3 show two additional embodiments of the invention in which the mechanical energy derived from a motor-driven drum is stored in an elastic element.

In Figure 2, the motor has an electric clutch for driving a drum 12 on which one end of a cable 13 is wound, the other end of the cable being secured to a thrust block 14 which engages a control member 7 at a predetermined displacement of the elastic element 4. Clutch 6 and drum 12 are drivably connected by means of gears 12a and 12b. The control member 7 opens the electric circuit of clutch 6. The thrust block 14 also has a nipple 14a which may fasten to the locking device 8. The landing gear 1 is connected by means of the drive 3 to the elastic element 4; it has a contact 9 which in the "down" position of the landing gear, closes the electric circuit of clutch 6. A wedge 10, guided by a bearing mounted on the frame of the aircraft and which can be driven into a prepared hole in the undercarriage, constitutes the locking element for the "down" position. Manually operable means for raising and lowering the landing gear is constituted by a lever 15 working by means of drive 16 on the locking devices 8 and 10, which devices are releasably held in their locking positions by springs 17 and 18 respectively. Spring or elastic element 11 tends constantly to restore the landing gear to the "down" position.

From Figure 2, the operation of the device shown therein will be clear when it is understood that it shows the undercarriage as it reaches the "down" position in which, at once, it is locked by wedge 10. To start the device, general switch 19 is closed by hand. Contacts 7 and 9 being closed, the electric clutch is engaged so as to connect the drum 12 with the motor 5 so that cable 13 is wound up on the drum, while elastic element 4 elongates. When the thrust of elastic element 4 reaches the position which is represented on the figure in dotted lines, the contact of the control member 7 opens, thereby openinng the circuit of the electric clutch 6 so as to disengage the motor. At the same time, the nose 14a of the thrust element 14 becomes latched by the locking device 8.

In order to raise the landing gear undercarriage, the pilot moves the hand lever 15 toward the left, thereby releasing the wedge 10 from its hole. The energy stored in the elastic element 4 is quickly transformed into tractive-work acting on drive 3, said drive being moved longitudinally while the elastic element 4 gets shorter. The effort exerted by the elastic element 4 being greater than that which is exerted by the elastic element 11 plus the weight of the undercarriage, the latter swings in the direction of an arrow up to the "raised" position in which it may be locked by a suitable means which is not shown in the drawing. As soon as the withdrawal of the wedge 10 has freed the undercarriage, the pilot may let lever 15 come back to its initial or normal position.

In order to put the undercarriage down, the pilot has only to move lever 15 toward the right, which puts down the pawl 8 and releases the thrust element 14 of the elastic element 4. The elastic element having no longer a fixed point of support and the drum 12 being disconnected from the clutch, the energy stored in the elastic element 4 does not resist the pull exerted by elastic element 11 and that of the weight of the undercarriage, and therefore the undercarriage is returned to its "down" position. The cycle of operation may start again. Of course, if the undercarriage is held in its "raised" position by a suitable locking device, the movement toward the right of lever 15 will free the undercarriage.

Figure 3 shows a device according to the present invention in which the chief components are the same as those of the above-described devices, but in which the control system is mechanical. Thus it will be sufficient to give a description of this mechanical control system, the operation otherwise being identical to that which has previously been described. The clutch 6 is mechanically operated by means of a bell crank lever 20 movable around an axis 21. Lever 20 is worked in a direction which causes engagement of the clutch, by means of an elastic thrust element 9, fixed to the undercarriage and working when the undercarriage has reached its "down" position. The torque of the motor 5 is transmitted by means of the mechanical clutch 6 to a gearing system 22, comprising gears 22a, 22b, 22c and a toothed rack 23 to which the elastic element 4 is connected. This toothed rack, on one side has a nose 23a which engages with a locking-pawl 8, and on the other side, a thrust element 7 which works lever 20 in such a direction that it causes the disengagement for a known displacement of the toothed rack corresponding to a fixed stored quantity of energy in elastic element 4. On account of its elasticity, the thrust element 9 yields under the action of the thrust element 7. Of course, the motor 5 may be (and this cannot in any way affect the field of the invention) an auxiliary motor, or else may be constituted by a motion gear on the propulsion motor of the aircraft.

Having now particularly described and ascertained the nature of my said invention and in what manner the same is to be performed, I declare that what I claim is:

1. In aircraft landing gear having an undercarriage a first energy accumulator for raising said undercarriage to its up position from its down position, motor means, means for connecting and disconnecting said first accumulator to said motor to store effective energy in the accumulator, when the under carriage reaches its down position, a second energy accumulator arranged to coact with the weight of the undercarriage for depressing the undercarriage to its down position, said second accumulator being arranged to be energized by the rising of the undercarriage from its down position to its up position, locking means for locking the undercarriage in the down position, and control means comprising a member operated by the undercarriage in the down position of the latter for urging said connecting and disconnecting means toward connecting position.

2. A landing gear according to claim 1, wherein said connecting and disconnecting means comprises clutch means, said control means further comprising gear and rack means effectively connected between said clutch means and said first accumulator.

3. A landing gear according to claim 1, wherein said second energy accumulator comprises a spring connected to and between the landing gear and a fixed point on the aircraft.

4. An aircraft landing gear according to claim 1, wherein said control means comprises another member operated by said first accumulator and connected to said connecting and disconnecting means whereby the last mentioned means is operated to disconnect the motor means from said first accumulator when sufficient energy has been stored therein to raise the undercarriage.

5. In an aircraft landing gear having an undercarriage swingable between up and down positions, a first accumulator arranged to coact with the weight of the undercarriage to depress the undercarriage from the up to the down position, first locking means for locking the undercarriage as it reaches the down position, said first accumulator being energized by raising the undercarriage from the down to its up position; a second accumulator connected to said undercarriage for raising said undercarriage from its down to its up position; motor means, clutch means for connecting said motor means to energize said second accumulator; and first control means operated by the undercarriage to engage the clutch means as the undercarriage reaches its down position so as to permit said motor means to energize said second accumulator, second control means operated by said second accumulator for disengaging said clutch means as a predetermined sufficient amount of energy to raise the undercarriage to its up position is stored in said second accumulator, second locking means for locking said second accumulator in the position thereof corresponding to the up position of the undercarriage, said second locking means being releasable to permit said first accumulator and the weight of the undercarriage to depress the undercarriage to the down position.

6. A landing gear according to claim 1, wherein said connecting and disconnecting means comprises electrically operated clutch means, means energizing said clutch including an electrical circuit involving a first switch arranged to be closed upon the release of the landing gear from its elevated position, and a second switch arranged to be closed by the movement of the landing gear to its down position.

HENRI LONGEPIERRE.

REFERENCES CITED

The following references are of record in the file of this patent:

UNITED STATES PATENTS

| Number | Name | Date |
| --- | --- | --- |
| 1,503,297 | Calagans | July 29, 1924 |
| 2,224,481 | Laraque | Dec. 10, 1940 |

FOREIGN PATENTS

| Number | Country | Date |
| --- | --- | --- |
| 851,143 | France | Sept. 25, 1939 |